G. S. NEELEY.
VOLTAGE REGULATOR FOR DYNAMO ELECTRIC MACHINES.
APPLICATION FILED NOV. 30, 1906.

904,887

Patented Nov. 24, 1908.

2 SHEETS—SHEET 2.

Witnesses
Edgar J. Farmer.
A. J. McCauley.

Inventor:
George S. Neeley
by Bakewell & Cornwall
Att'y's.

UNITED STATES PATENT OFFICE.

GEORGE S. NEELEY, OF ST. LOUIS, MISSOURI.

VOLTAGE-REGULATOR FOR DYNAMO-ELECTRIC MACHINES.

No. 904,887.     Specification of Letters Patent.     Patented Nov. 24, 1908.

Application filed November 30, 1906. Serial No. 345,790.

*To all whom it may concern:*

Be it known that I, GEORGE S. NEELEY, a citizen of the United States, residing at St. Louis, Missouri, have invented a certain new and useful Improvement in Voltage-Regulators for Dynamo-Electric Machines, of which the following is a full, clear, and exact description, such as will enable others skilled in the art to which it appertains to make and use the same, reference being had to the accompanying drawings, forming part of this specification, in which,—

Figure 1:
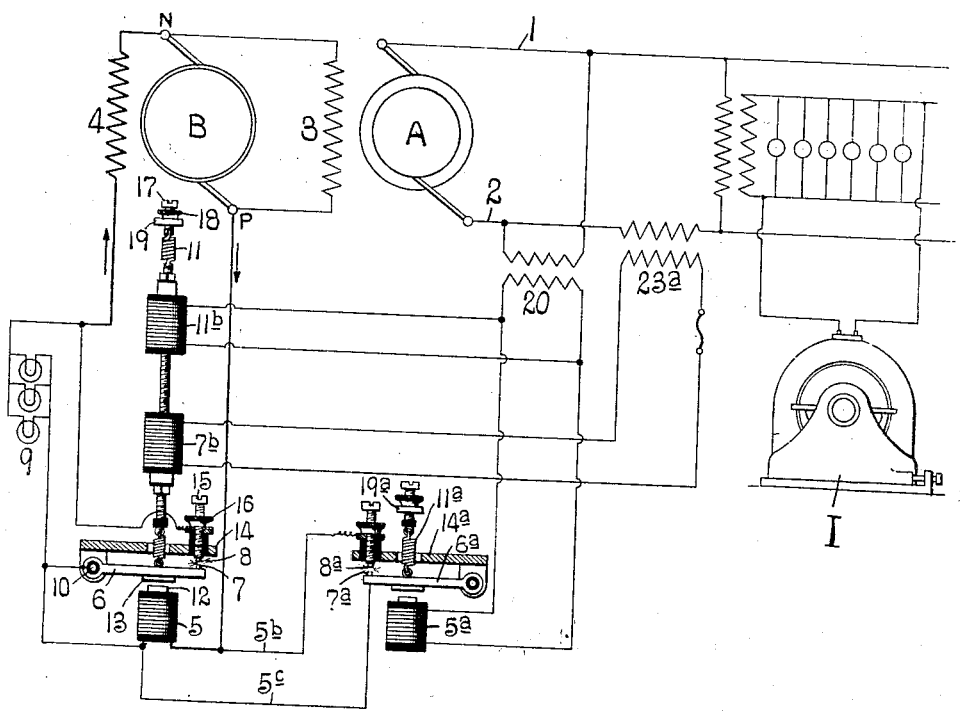
Figure 2:
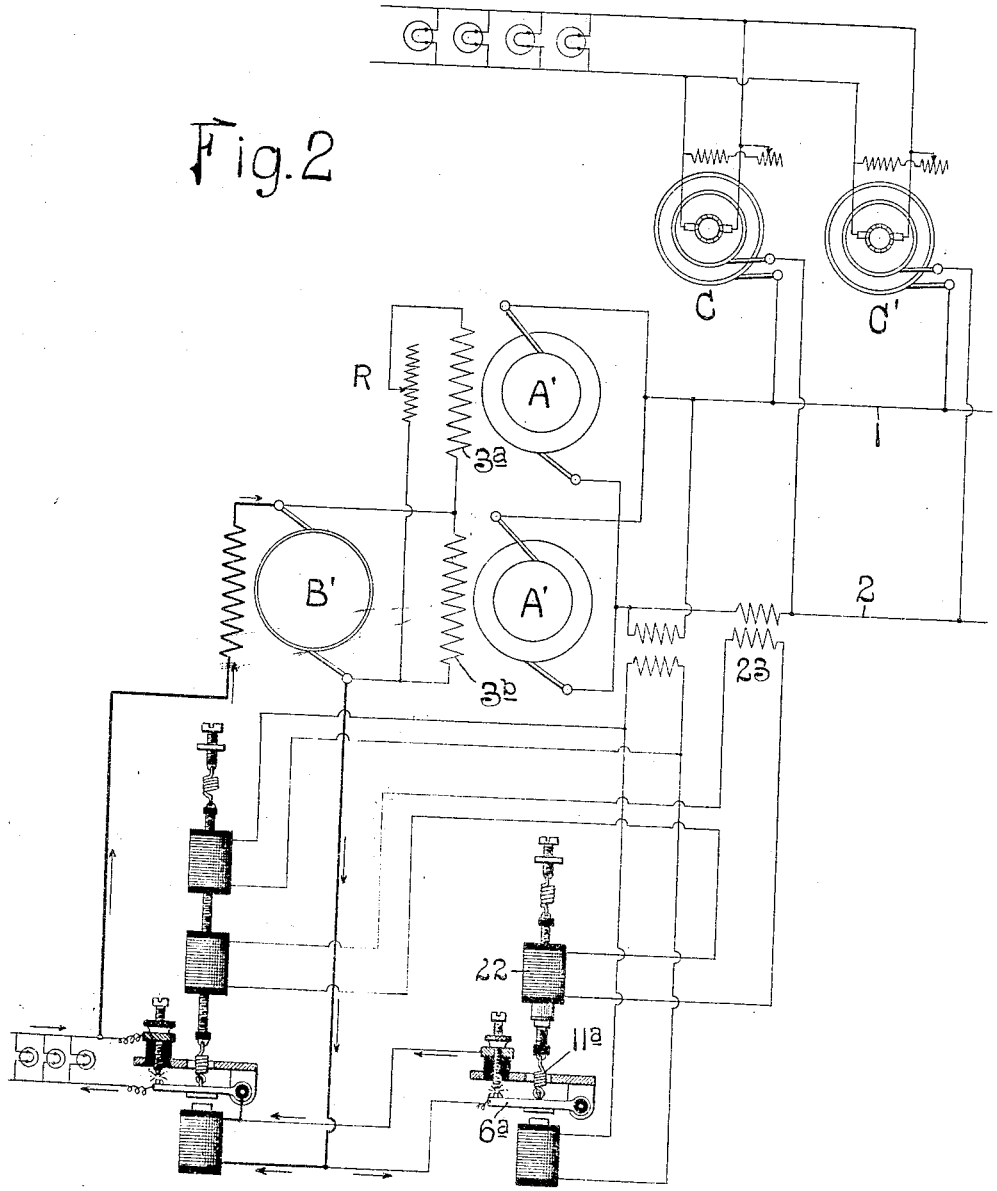

Figure 1 is a diagrammatic view illustrating a system involving my improved automatic voltage regulator for alternating current generators; and Fig. 2 is a diagrammatic view illustrating a modified form of my improvement in a system where rotary transformers are employed.

This invention relates to new and useful improvements in automatic voltage regulators for alternating current generators, the object being to automatically maintain a constant voltage in the work circuit or system, regardless of the demands for current upon the working dynamo, and especially when the power factor of the system is lowered on account of the use of induction motors on the system, wherein incandescent lights are also supplied.

My present invention is designed especially as an improvement upon the system shown in United States Letters Patent No. 838,800, granted to me December 18, 1906.

I have determined that where the apparatus disclosed in my aforesaid patent is employed in practice in a system where induction motors are used the alternating voltage runs sometimes from 5 to 10% lower than it should be. I believe that the reasons for this are the following: The magnet $11^b$, in the accompanying drawings, it will be recalled, is operated by the potential of the alternating current system, while the magnet $7^b$ is operated by the intensity of the alternating current output, the forces of these two magnets being opposed to each other. When the power factor of the system is lowered to such a degree that the current is lagging the electro-motive force, say to the extent of 90 degrees, the force of magnet $11^b$ is at its maximum value, while the force of magnet $7^b$ is at zero. As the force of magnet $11^b$ is exerted to lower the voltage, it will readily do so because the opposing force of magnet $7^b$ is withdrawn at the instant that the force of magnet $11^b$ is at its maximum.

From the above it will be seen that if the regulator was operating under unity power factor and the current should then be thrown out of phase with the electro-motive force so as to lag behind the same, there would be a shifting in the relative positions of the parts, to wit, the lowering of the force of magnet $7^b$ and the increasing of the force of magnet $11^b$ of my regulator, which produces increased excitation of the field of the exciter, which results in an increased potential, which compensates for a low power factor in the system. It will, of course, be understood that the low power factor in the system is produced by a lag in the phase of the current, and as the magnet $7^b$ at any given instant receives the magnetizing impulse later than the magnetizing impulse given to $11^b$, it will be obvious that the power thus given the magnet $11^b$ at an earlier instant acts to increase the regulating resistance in the exciter field. I have exaggerated the causes in order to better explain the condition which my present addition to my former system is intended to improve, where a lower power factor exists. It is not uncommon to find alternating current systems with a power factor of 75 where the angle of lag between the current and the electro-motive force is only about 45 degrees. The effect on the voltage by the use of the regulating system disclosed in my aforesaid patent is proportional to the power factor, and increases as the power factor recedes from unity.

Where a low power factor exists, that is, where the current lags behind the voltage of the system, such a condition demands considerably more exciting current to keep up the alternating voltage to normal. As applicant's system of magnetic control disclosed in his former patent No. 838,800 is based on an equal force, which results in differential forces, derived from the output and the input, it will be seen that when the power factor runs low, where the apparatus of said former patent is used, means must be provided for increasing the input (exciting current) faster than the output, and without letting it re-act upon the regulating resistance. It is this feature of shunting off this excess exciting current during the periods of low power factor so that it will not re-act on the regulating resistance, which is the gist of this present invention.

Applicant's present improvement does not involve any means for causing the voltage and current of an alternating current system to keep in phase; but it does involve means for increasing the excitation to keep up the normal voltage in the system regardless of how much current may be lagging behind the voltage of the system.

Magnet $11^b$ is in the form of a solenoid magnet whose core forms part of a connecting medium between the spring 11 and the armature 6. This magnet is in the circuit of the secondary winding whose primary is across the lighting or work circuit. Magnet $7^b$ is also in the form of a solenoid magnet whose core is around the connecting medium between the spring 11 and armature 6, and this magnet is energized by the intensity of the current supplied to the system or such part of it as it may be found necessary to use. A current transformer $23^a$ is employed to energize the magnet $7^b$.

The advantages of my improved system are many, chief among which may be mentioned the fact that the controlling elements are operated almost wholly by electro-magnetism which render the system very positive and sensitive in its action, causing the deliverance of a very steady voltage on the supply wires without the use of dash pots. There is no sparking at the contact points, and hence there is no need for condensers and differential windings on the magnets for the purpose of suppressing arcing at the contacts.

In the accompanying drawings, A is an alternating current generator and B is its exciter. 1 and 2 are the primary mains extending from the generator A, and I is an induction motor deriving current from the mains 1 and 2. 3 is the field coil of said generator. 4 is the field winding of the exciter B. The arrow heads indicate the direction in which the exciter field current travels.

Starting from the positive brush P of the exciter, the field current passes through the winding of magnet 5 thence to the pivoted armature 6. Part of the current passes across the contacts 7 and 8, the former of which is carried by the pivoted armature, while the latter is a fixed adjustable contact, and the rest of the current passes through the resistances 9, preferably in the form of specially made incandescent lamps with a negative temperature coefficient, the two parts of the field current then joining and flowing through the field winding 4, thence to the negative brush N of the exciter, thus completing the field circuit.

Armature 6 is pivoted at 10 and is influenced in one direction by the spring 11 which tends to close the gap between the contacts 7 and 8. Magnet 5, when energized, tends to open the gap between said contacts 7 and 8. The influence of magnet 5 is augmented by the magnetic effort of the pole face 12, which attracts the iron "keeper" 13 mounted on the movable armature 6. Contact 8 is stationarily mounted, but adjustable, in the stationary support 14. A contact-carrying screw 15 is held normally in position by the jam nut 16.

The tension of spring 11 is made adjustable by the screw 17 and the jam nut 18 working in a stationary support 19. $11^b$ is a magnet energized by the intensity of the work circuit for assisting the action of the spring 11.

When the contact 7 is in its extreme position away from the contact 8, the greatest resistance that can be offered to the field current is set up in the field circuit of the exciter; and if the contact 7 should impinge against the stationary contact 8 the field circuit of the exciter would then contain no effective regulating resistance at all. All intermediate positions of the contact 7 between these extreme positions automatically create a proportional and effective regulating resistance in the form of an arc in the field circuit of the exciter, the value of which is varied when a change of current output occurs by changing the strength of the forces which act upon the armature 6.

The above described parts are similar to those shown and described in my aforesaid patent No. 838,800, and in operation, if we assume for the moment that all of the current passing from the positive brush of the exciter passes through the winding of magnet 5, and thence to the pivoted armature 6, it will be seen that, depending upon the strength of the magnet 5 tending to pull the armature 6 in one direction to separate contacts 7 and 8, in opposition to the tension of the spring $1_1$, tending to pull said armature in the opposite direction, to close said contacts, the current will be divided, part of it passing through the contacts 7 and 8 and part through the resistance 9, depending upon which path offers the least resistance. In this manner the gap between the contacts 7 and 8 constitutes an automatic variable resistance in the field circuit of the exciter, around which the field current of said field circuit may be shunted through the resistance 9.

From the above it will be observed that the alternating current generator A has its field energized by the exciter B, and that the means for regulating the field resistance of the exciter consists of a variable resistance in series with the field of the exciter, which resistance is controlled by differential forces resulting from placing the intensity of the field current of the exciter in opposition to a magnet energized by the intensity of the current output of the machine and assisted by a yielding mechanical force, and supplying a shunt resistance 9 having a negative temperature coefficient to relieve said variable resistance.

My present invention contemplates the employment of means for automatically maintaining a constant voltage in the work circuit or system regardless of the condition or demands for current upon the working dynamo where the power factor is below "unity", on account of a mixed load of incandescent lights and induction motors; and consists essentially of a short-circuiting device, which, in addition to its short-circuiting capacity, also provides a shunt circuit having a variable resistance around the magnet 5, whereby the pull of said magnet 5 may be kept constant irrespective of the strength of the field current of the exciter B.

The short-circuiting device in my present construction consists of the following: A magnet $5^a$ is across the secondary winding of a potential transformer 20, the primary of which is across the mains 1 and 2. Attention is directed to the fact that the magnet 5 is influenced by the intensity of the exciter field current, while the magnet $5^a$ is influenced by the voltage across the mains 1 and 2. Magnet $5^a$ exerts a pull upon an armature $6^a$ carrying a movable contact $7^a$ which coöperates with an adjustable fixed contact $8^a$, the latter being mounted upon a stationary support $14^a$. A spring $11^a$ mounted in a stationary support $19^a$ and whose tension is adjustable, is connected to the armature $6^a$ and tends to close contacts $7^a$ and $8^a$, while the magnet $5^a$ tends to open said contacts. The contact point $8^a$ may be adjusted by providing means similar to those heretofore described in connection with the contact 8, and the tension of spring $11^a$ may be adjusted in a manner similar to the adjustment of the spring 11 heretofore described.

Wires $5^b$ and $5^c$ constitute a by-pass around the magnet 5 and connect respectively to the stationary contact $8^a$ and the movable contact $7^a$ of the short-circuiting device, so that when those contacts are closed magnet 5 is short-circuited, and when these contacts are opened the resistance offered by the length of air gap between the contacts $7^a$ and $8^a$ causes only a part of the current to flow through the magnet 5. All excess in the exciter field current, beyond the initial predetermined minimum flow is thus automatically diverted or shunted around the magnet 5 by the action of a magnet $5^a$ working against the tension of the spring $11^a$.

Assuming that the generator A and exciter B are running at normal speed, the operation of the above described parts is as follows: The tension of spring 11 is adjusted until the opposing pull of magnet 5 balances, we will say, at 100 volts, across the secondary terminals of the potential transformer 20, the voltage of the alternating mains 1 and 2 will be accurately maintained, as long as there is no change in the power factor of the system or the current output, because the continual re-action between the exciter field current, traversing the winding of the magnet 5, tends to increase the resistance to its own flow, while the pull of magnet $7^b$ assisted by the tension of spring 11 tends to decrease said resistance.

The voltage of the alternating mains 1 and 2 now being such as to give 100 volts at the necessary terminals of the potential transformer 20, the tension of spring $11^a$ is adjusted until some of the field current traversing the winding of magnet 5 is on the point of being diverted or shunted through the by-pass wires $5^b$ and $5^c$ and the contacts $7^a$ and $8^a$.

As the generator A and exciter B are running at normal speed and the system has been adjusted to give a normal of 100 volts at the secondary terminals of the transformer 20, and, on account of an induction motor load, the power factor of the system is suddenly lowered to, say 70%, during this condition the apparent current output is not equal to the current input (current input in this instance meaning the field current of the exciter, which bears a definite relation to the alternator field current); thus the pull of magnet 5 would exceed the pull of magnet $7^b$ (due to the alternating current lagging behind the alternating current voltage, producing effects in magnets $11^b$ and $7^b$), and on account of this excess pull of the magnet 5 over the magnet $7^b$ the voltage across the mains 1 and 2 would be lowered (because the pull of magnet 5 always increases with the exciter field current, tending to increase the resistance across the contacts 7 and 8), if it were not for the fact that as the alternating voltage drops, the pull of magnet $5^a$ is proportionately weakened. The spring $11^a$ then acts to short-circuit the winding of magnet 5 by closing the gap between the contacts $7^a$ and $8^a$, thus diverting the exciter field current from the magnet 5, until the distance between the contacts 7 and 8 is such that the field excitation is raised to the point where normal voltage on the mains 1 and 2 is again restored. At this point the force of magnet $5^a$ is equal to the tension of the spring $11^a$, and any further short-circuiting action is instantly stopped when normal voltage has been restored. Hence it will be seen that during the condition of normal voltage and "unity" power factor magnet $5^a$ and allied apparatus lies practically dormant, because magnet 5 and magnet $7^b$ are doing practically all the regulating so long as the power factor of the system remains 100% or "unity". Therefore, magnet 5ª and kindred apparatus is of no use except in cases where a low power factor obtains. For the sake of illustration we will assume that during the condition of low power factor it takes ¾ of an ampere of current in the exciter field winding 4 to excite up to the normal alternating current voltage, and, further, that ½ ampere is flowing through the winding of magnet 5 and the remaining ¼ ampere is flowing through the by-pass wires 5ᵇ and 5ᶜ and the contacts 7ª and 8ª. Should there be another increase in the current output in the mains 1 and 2 resulting in a further lowering of the power factor of the system, the result will be a drop in the voltage in the mains 1 and 2, then the pull of magnet 5ª will be again weakened in proportion. This action causes a further momentary short-circuiting of the magnet 5 by the instantaneous closing of the gap between the contacts 7ª and 8ª, resulting from the pull of the spring 11ª. Magnet 7ᵇ and spring 11 now act to instantly shorten the distance between the contacts 7 and 8, which results in instantaneously increasing the field excitation until normal voltage is restored in the primary mains 1 and 2. When normal voltage is restored, magnet 5ª has the power to prevent the voltage from rising above normal by partly or entirely removing the short circuit from around the magnet 5 by widening the gap between the contacts 7ª and 8ª. This action increases the pull of magnet 5, and the gap between the contacts 7 and 8 begins to increase due to the increasing pull of magnet 5. Hence all abnormal movement of the contact 7 is instantly checked because the resistance 9 becomes more and more effective as the gap widens, when all of the parts will assume their normal steady condition as before. The field current of the exciter may now be 2 amperes but 1½ ampere will be diverted through the wires 5ᵇ and 5ᶜ and contacts 7ª and 8ª, while the original 1½ ampere will still flow in the winding of magnet 5, causing its force or pull to be exactly what it was initially. The reverse action takes place when the load or current output is decreased on the mains 1 and 2. Under these conditions of decreasing load or current output the potential across the mains 1 and 2 will momentarily exceed normal, which results in magnet 5ª acting to separate the contacts 7ª and 8ª, which would cause the full intensity of the exciter field current to be passed through the winding of magnet 5. Magnet 5 will separate contacts 7 and 8 and the resistances 9 will be instantly made fully effective in the field circuit of the exciter. These conditions tend to instantly reduce the field current of the exciter, and of course the voltage of the alternating current generator will be correspondingly reduced until normal voltage on the mains 1 and 2 is again reached, at which point the tension of spring 11ª equals the pull of magnet 5ª, at which time the short-circuiting action of the contacts 7ª and 8ª becomes effective.

From the above it will be seen that as soon as normal voltage has been disturbed, either by a decreasing or an increasing power factor, either the action of spring 11ª or magnet 5ª predominates and becomes effective, causing more or less of the exciter field current to be passed through the winding of magnet 5 or diverted through the wires 5ᵇ and 5ᶜ and contacts 7ª and 8ª.

In Fig. 2, I have illustrated diagrammatically my improvement wherein a plurality of alternating current generators A′ are supplying current in common to a plurality of rotary converters C and C′. The exciter B′ supplies exciting current in common to the generators A′. The rheostat R is for the purpose of initially adjusting the resistance in the field winding 3ª equal to that of the field winding 3ᵇ, so that each generator will deliver its pro rata of the total current to the rotary transformers C and C′.

The regulating system shown in Fig. 2 is similar to that shown in Fig. 1 except that a magnet 22, deriving its energy from the series transformer 23, is employed to automatically supplement the action of the spring 11ª in proportion to the current output. Magnet 22 is operated from the intensity of the current output of the machine. The object of this is to increase the voltage across the mains 1 and 2 to compensate for line losses. The results obtained from the magnetizing effect of the current upon the mains 1 and 2 is the same as if the tension of the spring 11ª was manually increased proportional to the increase of current output, which action, as before explained, increases the alternating current voltage; and, likewise, the action is the same as if the tension of the spring 11ª was manually decreased proportional to the load decrease. By the use of magnet 22, in Fig. 2, the action is absolutely accurate and automatic for all extreme and intermediate conditions of load increase or decrease. It might be well to state that magnet 22 is a solenoid magnet whose core forms part of a connecting medium between the spring 11ª and the armature 6ª.

Having thus described the invention, what is claimed as new and desired to be secured by Letters Patent is:

1. The improvement in the art of regulating an alternating current generator, the field of which is energized by an exciter, the same comprising means for regulating the field resistance of the exciter in response to differential electro-magnetic forces resulting from placing the intensity of the field current of the exciter in opposition to the intensity of the current output of the generator, and means for varying the force derived from the intensity of the field current of the exciter; substantially as described.

2. The improvement in the art of regulating the field of an alternating current generator, the field of which is energized by an exciter, comprising a variable resistance in series with the field of the exciter, and means for controlling the said variable resistance in response to differential electro-magnetic forces resulting from placing the intensity of the field current of the exciter in opposition to the intensity of the current output of the generator, supplying a shunt resistance having a negative temperature coefficient to relieve said resistance, and means for varying the force derived from the intensity of the field current of the exciter when the power factor of the alternating current system recedes from "unity"; substantially as described.

3. The improvement in the art of regulating an alternating current generator, the field of which is energized by an exciter, comprising means for regulating the field resistance of the exciter in response to differential electro-magnetic forces resulting from placing the intensity of the field current of the exciter in opposition to the intensity of the current output of the generator, and supplementary means whereby the voltage of the current output of the said alternating current generator magnetically regulates the action of the electro-magnetic force derived from the field current of the exciter by varying said force when the power factor decreases; substantially as described.

4. The improvement in the art of regulating the field of an alternating current generator, the field of which is energized by an exciter, comprising a variable resistance in the field circuit of the exciter, means for controlling the effectiveness of the said variable resistance by differential electro-magnetic forces resulting from placing the intensity of the field current of the exciter in opposition to the intensity of the current output of the generator, supplementary electro-mechanical means whereby the voltage of the current output of the said alternating current generator is made to magnetically regulate the magnetic action obtained from the intensity of the field current of the exciter by varying the force derived from the intensity of the current of the exciter on a decreasing power factor, and shunt resistances having negative temperature coefficiencies to relieve the said variable resistance; substantially as described.

5. The combination of an alternator, an exciter therefor, means for regulating the field resistance of the exciter in response to differential electro-magnetic forces resulting from placing the intensity of the field current of the exciter in opposition to the intensity of the current output of the generator, and means for varying the force derived from the intensity of the field current of the exciter proportional to the voltage of said alternator; substantially as described.

6. The combination of an alternator and its exciter, a variable resistance in series with the field of the exciter, said resistance being responsive to the action of two magnets, one being in circuit with the exciter field and the other being energized by the work circuit, means for causing the magnet in circuit with the exciter field to be short-circuited, and electro-magnetic means energized by the voltage of the alternator for opposing said last-mentioned means, and rendering the same ineffective; substantially as described.

7. The combination with means for regulating the resistance of the field circuit of the exciter of an alternating current generator, said means including a magnet in series with the field of the exciter, of a shunt containing a variable resistance around said magnet, and electro-magnetic means for varying said last-mentioned resistance, said means being energized both by the current and by the voltage of the work circuit of the system; substantially as described.

8. The combination with means for regulating the resistance in the field circuit of the exciter of an alternating current generator, said means including a magnet in series with the field of the exciter, of a shunt containing a variable resistance around said magnet, a magnet energized by the intensity of the work circuit for decreasing said variable resistance, and an opposing magnet energized by the voltage of the work circuit for increasing said variable resistance; substantially as described.

9. The improvement in the art of regulating the voltage of a plurality of electric generators that are supplying current in common to rotary-transformer mains, comprising, in combination, a single exciter for simultaneously exciting the fields of all the generators, a regulating resistance and a regulator having differential magnet coils for controlling the said regulating resistance, one of the said magnets being energized by the exciter field current, and the other magnet being energized by the current output of the said generators, and means for varying the effectiveness of one of said differential coils, whereby the generator voltage is maintained at normal regardless of what the power factor of the system may be; substantially as described.

10. In a system of automatic voltage regulation for alternating current generators, the combination of a magnet and a regulating resistance in the field circuit of the exciter, and means for short-circuiting the winding of the said magnet when the voltage of the generator falls below normal on account of low power factor; substantially as described.

11. The combination of a plurality of electric generators for supplying current to a common rotary transformer main, a single exciter for supplying all of the fields of said generators, a regulating resistance in the field of said single exciter, differential coils for controlling said regulating resistance, and means deriving energy from said common main for varying the effectiveness of one of said differential coils; substantially as described.

12. The combination with rotary transformer main line wires, of a plurality of electric generators for supplying current thereto, separately excited fields for said generators, means for regulating the field resistance of the exciter in response to differential forces resulting from placing the intensity of the field current of the exciter in opposition to the intensity of the current output of said generators, and means for varying the force derived from the intensity of the field current of the exciter; substantially as described.

13. The combination with a plurality of electric generators whose fields are energized by an exciter, said generators supplying the same rotary transformer mains in common, a variable resistance in series with the field of the exciter, said resistance being responsive to the action of two magnets, one in circuit with the exciter field and the other of which is energized by the work circuit, and differential coils affected respectively by current and voltage fluctuations of the work circuit for controlling the magnet in circuit with the exciter field; substantially as described.

14. The combination with a plurality of generators and their exciter, said generators supplying a common rotary-transformer main, a variable resistance in series with the field of the exciter, said resistance being responsive to the action of two magnets, one in circuit with the exciter field, and the other of which is energized by the work circuit, and means for causing the magnet in circuit with the exciter field to be short-circuited, and electro-magnetic means energized by the voltage of the generator for rendering said last-mentioned means ineffective; substantially as described.

15. The combination with a plurality of electric generators for supplying current in common to a rotary-transformer main line, an exciter for said generators, a variable resistance in the field circuit of said exciter, a shunt for said variable resistance, means for controlling said variable resistance, said means comprising a magnet in the field circuit of the exciter, said magnet when energized tending to increase said variable resistance, means opposing said magnet tending to decrease said variable resistance, and means deriving energy from the main line for varying the power of said magnet; substantially as described.

16. The combination of a dynamo electric machine, a voltage-controlling circuit therefor, a magnet and an automatic variable resistance in series with said voltage-controlling circuit, an opposing magnet in series with the work circuit of the said dynamo electric machine, means for short-circuiting the winding of said first-mentioned magnet, and means deriving energy from the voltage of the work circuit for rendering said last-mentioned means ineffective; substantially as described.

17. The combination of a plurality of electric generators, a voltage-controlling circuit common to all of the said generators, a magnet and a regulating resistance in said common voltage-controlling circuit, said magnet being arranged to increase the regulating resistance, an opposing magnet energized by the current output of the said generators, said opposing magnet being arranged to decrease the said regulating resistance, a third magnet energized by the voltage of the said generators for assisting the first mentioned magnet, and auxiliary means for periodically short-circuiting the winding of the first mentioned magnet; substantially as described.

18. The combination of an alternator, an exciter therefor, a regulator for controlling the current output of the exciter, comprising two main differential magnets, one of said magnets and a variable resistance being in series with the field of the exciter, the other main magnet being in series with the work circuit of said alternator, and auxiliary means energized by the work circuit for short-circuiting the winding of the first-mentioned magnet during periods of low power factor; substantially as described.

19. A regulator for a dynamo, having a regulating resistance, two main controlling magnets, one of which is in circuit with the regulating resistance, and the other one in series with the work circuit of the system, and supplementary means energized by the voltage of the work circuit for rendering all of the energy of the first mentioned main magnet effective during periods of normal power factor; substantially as described.

20. The combination of a regulator for a dynamo, having a main regulating resistance, two main differential coils for operating said regulating resistance, one of which is responsive to the current through the regulating resistance, and the other is responsive to the current output of the said dynamo, a third supplementary coil energized by the voltage of the said dynamo for assisting the action of the first mentioned differential coil, mechanical means exerting a yielding force for opposing the action of the first and third mentioned coils, and automatic electro-mechanical means for controlling the effectiveness of the current in the winding of the first mentioned differential coil during the prevalence of low power factor in the system supplied by said dynamo; substantially as described.

21. The improved means for preserving a uniform voltage in an alternating current system operating under a condition of low power factor, comprising, in combination, a plurality of generators for simultaneously supplying current in common to a system of distribution, a single exciter for all of the said generators, means for controlling the field excitation of the said exciter in response to the action of differential coils, one of said coils being energized by the exciter field current, and the other coil being energized by the current output of the said generators, a supplemental coil energized by the voltage of the system for assisting the action of the first-mentioned differential coil, a mechanically yielding force for opposing the action of the first and last-mentioned coils, and auxiliary means for automatically short-circuiting the winding of the first-mentioned differential coil when the voltage of the system falls below normal due to low power factor; substantially as described.

In testimony whereof I hereunto affix my signature in the presence of two witnesses, this twenty sixth day of November 1906.

GEORGE S. NEELEY.

Witnesses:
F. R. CORNWALL,
LENORE WILSON.